United States Patent
Blaum et al.

(12)
(10) Patent No.: US 6,496,312 B2
(45) Date of Patent: Dec. 17, 2002

(54) USE OF SNAKE-IN-THE-BOX CODES FOR RELIABLE IDENTIFICATION OF TRACKS IN SERVO FIELDS OF A DISK DRIVE

(75) Inventors: Mario Blaum, San Jose, CA (US); Tuvi Etzion, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 09/755,413

(22) Filed: Jan. 5, 2001

(65) Prior Publication Data

US 2002/0126407 A1 Sep. 12, 2002

(51) Int. Cl.$^7$ ................................................. G11B 5/09
(52) U.S. Cl. ............................ 360/49; 360/53; 714/701
(58) Field of Search ............................. 360/49, 48, 53, 360/77.08, 78.14; 714/701, 769, 770, 758, 777

(56) References Cited

U.S. PATENT DOCUMENTS 3,753,230 A  *  8/1973  Hoffner, II ..................... 377/28

* cited by examiner

*Primary Examiner*—Alan T. Faber
(74) *Attorney, Agent, or Firm*—Gates & Cooper LLP (57) ABSTRACT

A "snake-in-the-box" (SITB) code is used to encode a track identifier (TID) in a servo sector of a disk drive to identify a particular track on the disk surface. The SITB code describes the longest possible vector that can fit into a finite space, and comprises a type of difference-preserving code. When an SITB code is used for the TID, any single bit error in the TID will be detected. The Hamming distance for TIDs of adjacent tracks is 1 with a SITB code, as with a Gray code. However, for TIDs of tracks that are not adjacent, the Hamming distance is at least 2 with a SITB code.

48 Claims, 4 Drawing Sheets

USE OF SNAKE-IN-THE-BOX CODES FOR RELIABLE IDENTIFICATION OF TRACKS IN SERVO FIELDS OF A DISK DRIVE

BACKGROUND OF THE INVENTION

1. Field of the Invention

The present invention relates generally to servo control systems used for positioning read/write transducers in data storage devices, and more particularly, to the use of snake-in-the-box codes for reliable identification of tracks in servo fields of a disk drive.

2. Description of Related Art

It is well known in the art to store data on magnetic or optical disk drives on one or more tracks of predetermined format disposed on a disk-shaped recording media. The data is written to and read from the tracks using one or more transducers, which typically comprise read/write heads. Reading data from a desired one of the tracks on the disk surfaces requires knowledge of the read/write head position relative to the track as the disk rotates and the head is moved across the disk, and requires precise centering of the head over the disk track. Conventionally, the read/write head is mounted on a head positioning assembly that is moved by a servo control loop.

The servo control loop controls movement of the head positioning assembly across the disk surface to move the read/write head from track to track (track seeking) and, once over a selected track, to maintain the read/write head in a path over the centerline of the track (track following). Centering the read/write head over a track permits accurate reading and recording of data in the track.

In most devices, the servo control loop is a closed loop system that utilizes servo information obtained from the disk surface to provide feedback for the track seeking and track following functions. Some devices store servo information on a single, dedicated disk surface (known as a dedicated servo system), while other devices store servo information between the data regions of the disk surface (known as an embedded servo system).

In embedded servo systems, the servo information is stored in a servo sector that is usually comprised of the following fields:

1. an Automatic Gain Control (AGC) field that can be represented a string of ones;
2. a Servo Identification (SID) field that is comprised of a pattern of zeros and ones, combining synchronization properties, error tolerance, and other information, such as index, non-index, odd or even sector, etc.;
3. a Track Identification (TID) field that is usually a Gray-encoded track position value, and may also contain redundant bits for error detection and correction (see U.S. Pat. No. 5,617,536, issued April 1997, to D. A. Freitas, L. J. Serrano and M. Yu, and entitled "Method and Apparatus for Servo Control with Error Detection of Gray (Pennington) Code Used for Servo Track ID," which patent is incorporated by reference herein); and
4. a position error signal (PES) field that is usually comprised of four different bursts (represented as strings of ones) whose function is setting the head on track through an integration process.

In the prior art, the TID field is Gray encoded because the read/write head is not necessarily on track yet when the TID is read (as stated above, this function is accomplished by the PES field in the servo sector). In a worst case situation, the read/write head may be in the middle of two adjacent tracks. Thus, it is convenient that TIDs for adjacent tracks be as close as possible to each other.

Gray codes accomplish this property, since the (Hamming) distance between Gray-encoded TIDs of adjacent tracks is exactly 1. Any ambiguity with respect to correct track position when the head is positioned between two tracks is resolved by the PES, since the burst configuration changes for even and odd tracks.

However, there are problems with the use of Gray codes for TIDs, in that Gray codes are not immune to bit errors caused by disk defects. As a result, bit errors in a TID, for both on-track as well as off-track situations, may be uncorrected, such that the TID identifies the wrong track.

For example, suppose a set of four tracks A, B, C, and D have the following TIDs:

| Track | TID |
|-------|-----|
| A     | 00  |
| B     | 01  |
| C     | 10  |
| D     | 11  |

Suppose a single bit error occurs, and the TID for track A is misread as 10 rather than 00. The disk drive will incorrectly believe that the read/write head is on track C, and not track A, which is two tracks away.

The problem is difficult to resolve when traditional Gray codes are used, since Gray-encoded TIDs for neighboring tracks have a small minimum distance, mainly a distance of 1, while error detection and correction codes try to use a large minimum distance.

Therefore, there is a need in the art for techniques that eliminate such errors. Specifically, there is a need in the art to provide improved error detection and correction capabilities through the use of novel encoding schemes. To this end, the present invention uses "snake-in-the-box" (SITB) codes for TIDs, such that adjacent TIDs are at a distance of exactly 1 (like traditional Gray codes) while non-adjacent TIDs words are at a distance of at least 2.

SITB codes are described in the prior art, such as found in the publication G. Paterson and J. Tuliani, "Some New Circuit Codes," IEEE Transactions on Information Theory, 1305–1309 (1998), which publication is incorporated by reference herein. However, the prior art has not used SITB codes for TIDs in disk drives. In addition, the prior art uses SITB codes that are of a combinatorial type, wherein, given a code of length n, it is desirable to obtain a snake-in-the box code with as many codewords as possible. The present invention, on the other hand, is more interested in simple encoding and decoding logic than in maximizing the number of codewords for a given length.

SUMMARY OF THE INVENTION

To minimize the limitations in the prior art described above, and to minimize other limitations that will become apparent upon reading and understanding the present specification, the present invention uses a "snake-in-the-box" (SITB) code to encode a track identifier (TID) in a servo sector of a disk drive to identify a particular track on the disk surface. The SITB code describes the longest possible vector that can fit into a finite space, and comprises a type of difference-preserving code. When an SITB code is used for the TID, any single bit error in the TID will be detected. The Hamming distance for TIDs of adjacent tracks is 1 with a SITB code, as with a Gray code. However, for TIDs of tracks that are not adjacent, the Hamming distance is at least 2 with a SITB code.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Data Storage Device

Figure 1:
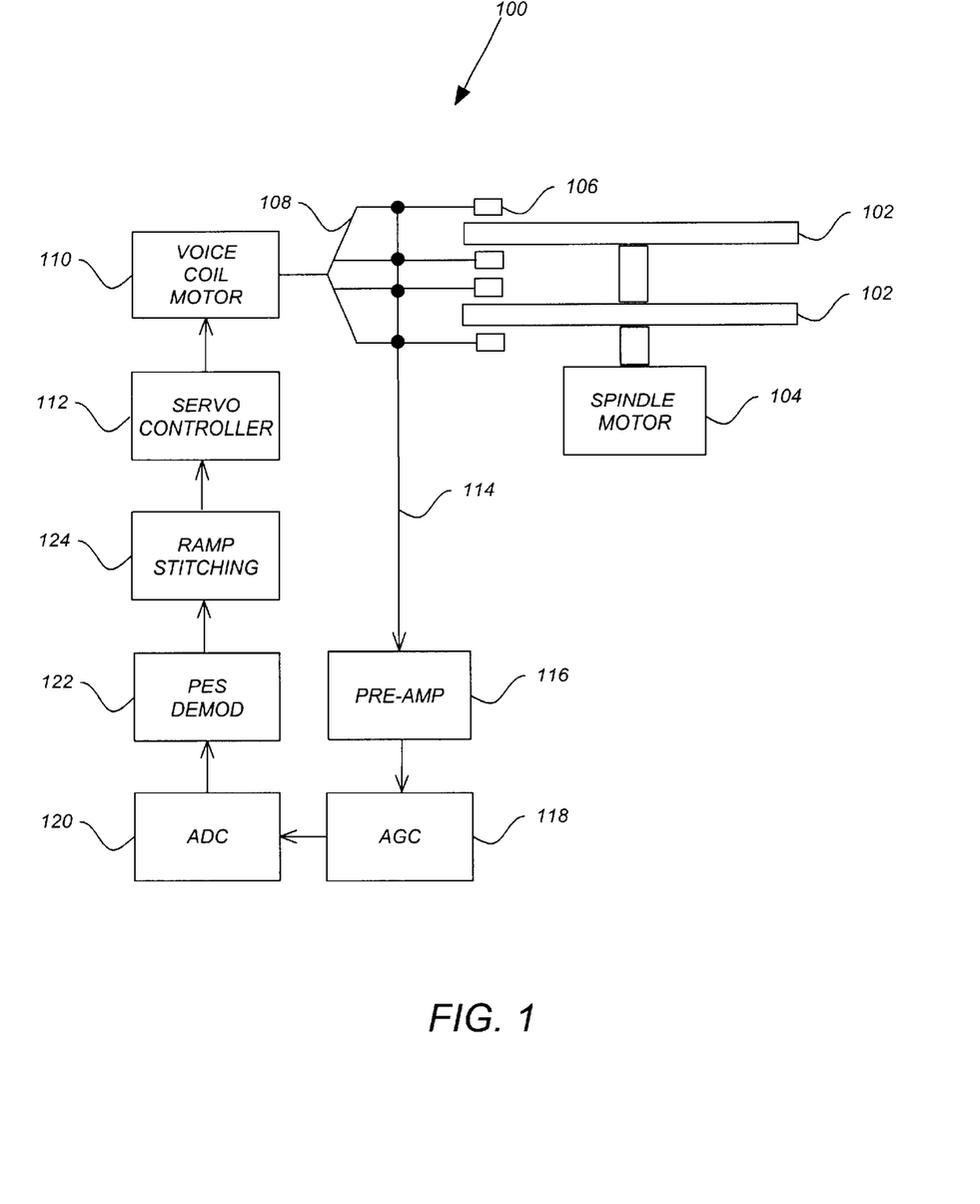
FIG. 1 illustrates the components of a data storage device according to the preferred embodiment of the present invention.

FIG. 1 is a block diagram of an exemplary data storage device, e.g., a disk drive according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 100 stores information on the surfaces of one or more stacked disks 102 in the form of transitions or patterns formed on one or more tracks on the surfaces of the disks 102. The disks 102 are rotatably mounted on a spindle motor 104. Transitions are written to or read from the disk 102 surfaces via one or more transducers 106, known as read/write heads, supported in close proximity to the disk 102 surfaces by a head positioning assembly 108, wherein the transducers 106 convert electrical signals into transitions during a writing phase and convert the transitions into electrical signals during a reading phase. The head positioning assembly 108 positions the transducers 106 over the disk 102 surfaces in a linear or rotary manner by operation of a voice coil motor (VCM) 110, which is controlled by a servo control loop that includes a servo controller 112.

Closed servo control loop systems utilize servo information obtained from the disk 102 surfaces as feedback to perform the track seeking and following functions. Some disk drive 100 designs store servo information on a single, dedicated disk 102 surface (i.e., dedicated servo), while other disk drive 100 designs, and most tape drives, embed servo information between the data regions of the disk 102 surfaces (i.e., embedded servo). Generally, the servo information is written using an external positioning device known as a pusher or a servo-writer, which may use both the head positioning assembly 108 and the transducers 106 of the disk drive 100, as well as other components of the disk drive 100, to write the servo information.

During the operation of the disk drive 100, a servo information signal 114 is generated by the transducers 106 and provided to a preamplifier (PRE-AMP) 116, which amplifies the servo information signal 114 and provides the amplified signal 114 to an automatic gain control (AGC) 118. The AGC 118 adjusts the gain applied to the signal 114 to maintain the signal 114 amplitude within a range that is predetermined to simplify signal processing, reduce noise, and improve linearity. The amplified signal from the AGC 118 is provided to an analog-to-digital converter (ADC) 120 that asynchronously converts and digitizes the signal 114.

The digitized servo information signal 114 is then provided to a PES demodulator (PES DEMOD) 122, which demodulates it into a primary position error signal (PESP) and a quadrature position error signal (PESQ) that indicate the direction and extent of movement required to maintain the read/write head 106 centered about a track on the disk 102. The PESP and PESQ signals are derived from two sets of patterns (e.g., A, B,C, and D burst patterns where PESP= A−C and PESQ=B−D) that are quadrature to each other in space. The PESP and PESQ are cyclic and out of phase by ninety degrees or one quarter phase.

The ramp stitching block 124 discards the PESP and PESQ values beyond where the absolute value of PESP equals the absolute value of PESQ and "stitches" the linear sections of the PESP and PESQ values together at their endpoints to form a substantially linear PES for each track on the disk 102. If desired, the PES can be further linearized by the servo controller 112. The servo controller 112 then uses the PES, as well as other servo information, to generate the control signals to the VCM 110 to move the head positioning assembly 108 and read/write heads 106 to the desired locations.

The resulting PES indicates the deviation of the read/write head 106 from the centerline of a track. If the amplitude difference in information from both sides of the centerline is zero, then it is assumed that the read/write head 106 is positioned exactly over the centerline. A positive amplitude difference in the information indicates that the head 106 is off center in one direction and a negative amplitude difference in the information indicates that the head 106 is off center in the opposite direction. Thus, the PES provides an indication of the direction and extent of read/write head 106 movement required to maintain the head 106 centered about the track.

Servo Information

Figure 2:
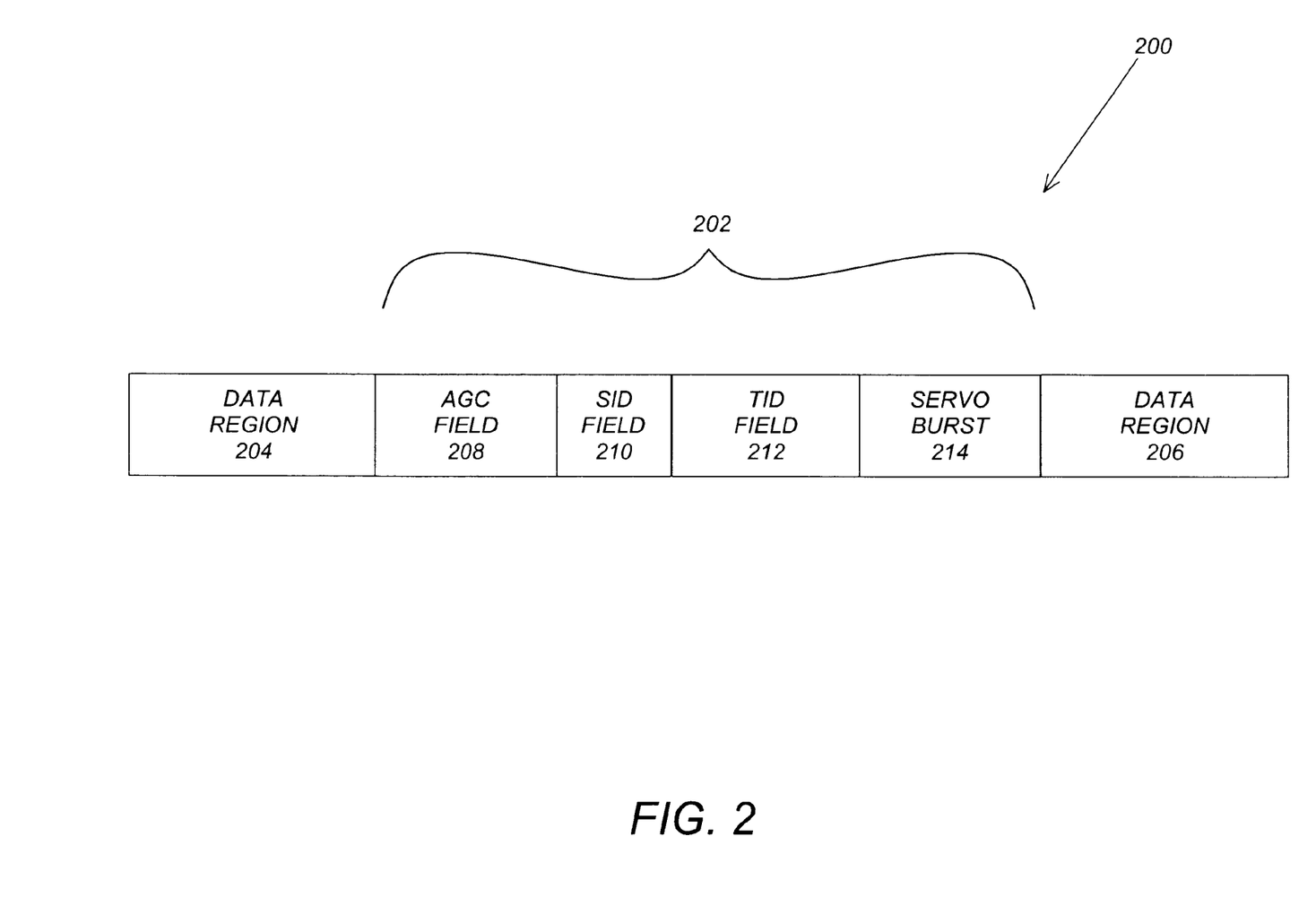
FIG. 2 illustrates an embedded servo sector according to the preferred embodiment of the present invention.

FIG. 2 illustrates the servo information 200 that is embedded in one or more servo sectors 202 on each disk 102 surface, wherein the servo sector 202 is embedded between data regions 204 and 206, although those skilled in the art will recognize that the servo information could be recorded on a separate disk 102 surface. The servo sector 202 comprises an automatic gain control (AGC) field 208, a sector identification mark (SID) 210, a track identifier (TID) field 212, and a servo burst region 214. The AGC field 208 typically comprises a repeating synchronization pattern, and is used to adjust the servo control loop of FIG. 1 to the amplitude and phase of the servo information to follow. The TID field 212 comprises, for example, a 19-bit binary number that includes a numerical value for uniquely identifying the current track. The TID field 212 also or alternatively may include cylinder, head and sector numbers corresponding to the particular servo sector 202. The TID field 212 is followed by a servo burst region 214, preferably of the quadrature burst type.

Operation of the Servo Control Loop

The present invention uses "snake-in-the-box" (SITB) codes as TIDs 212 to identify a particular track on the disk 102 surface. SITB codes are well known in the art, but their use in encoding TIDs 212 is novel.

SITB codes describe the longest possible vector that can fit into a finite space, and comprise a type of difference-preserving code. When an SITB code is used for the TID 212, any single bit error in the TID 212 will be detected. The Hamming distance for TIDs 212 of adjacent tracks is 1 with a SITB code, as with a Gray code. However, for TIDs 212 of tracks that are not adjacent, the Hamming distance is at least 2 with a SITB code.

Thus, if the disk 102 has a large number of tracks, typically $2^{15}$ tracks for a standard disk drive 100, a single bit error in one of the more significant bits of the TID 212 can cause problems if the TID 212 is Gray-encoded, but not for a TID 212 that is SITB-encoded. Therefore, the read/write head 106 is less likely to read an erroneous TID 212 and order the head positioning assembly 108 to move a significant and erroneous distance on the disk 102 surface, which of course wastes time and slows down overall to transfer speed.

Consider an example describing the encoding and decoding logic for a [19,15] SITB code, wherein 15 bits of a track identifier are mapped into 19 bits of a TID field 212 in a servo sector 202. The number k=15 was chosen for this example because a typical disk drive 100 has up to $2^{15}$ tracks that are identified by the TIE field 212.

However, those skilled in the art will recognize that any value of k could be used instead, and the number k=15 is provided for illustrative purposes only. For example, the publication G. Paterson and J. Tuliani, "Some New Circuit Codes," IEEE Transactions on Information Theory, 1305–1309 (1998), which is incorporated by reference herein, describes a [17,15] SITB code. On the other hand, the logic equations of the SITB code presented herein are much simpler. Therefore, there is a tradeoff between efficiency of the SITB code and simplicity of the implementation. The next two subsections describe the actual encoding and decoding equations for the [19,15] SITB code.

Encoding Logic

Figure 3:
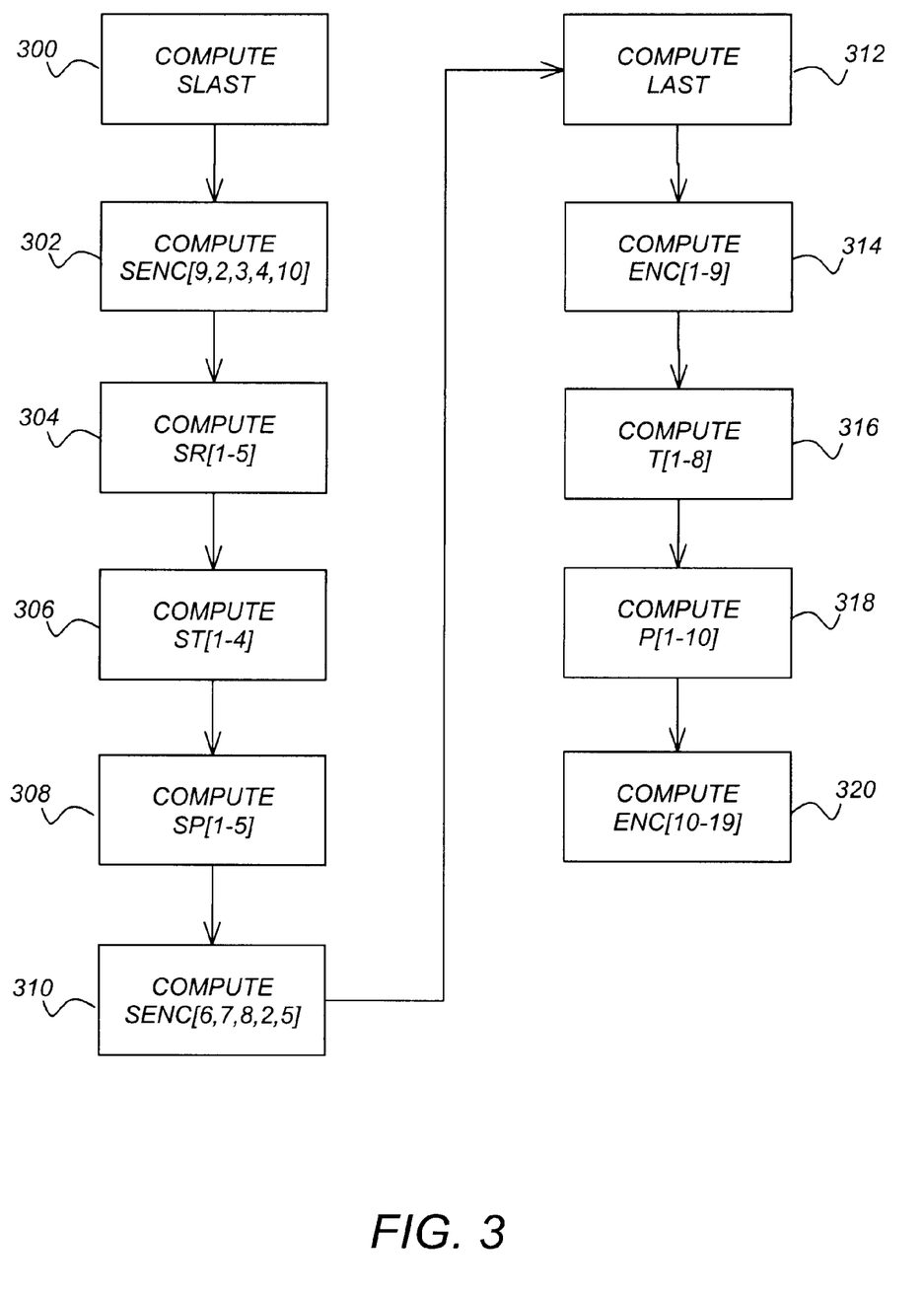
FIG. 3 is a flow chart illustrating the encoding logic performed by a servo controller during the writing of a servo sector in the preferred embodiment of the present invention.

FIG. 3 is a flow chart illustrating the encoding logic or steps performed by the servo controller 112 during the writing of the servo sector 202 in the preferred embodiment of the present invention. This logic is described in the format of Boolean logic, wherein the input to the encoding logic is given by a 15-bit vector (I[1], I[2], . . . I[15]) that represents the track identifier and an output from the encoding logic is given by a 19-bit vector (ENC[1], ENC[2], . . . , ENC[19]) that represents the TID field 212 of the servo sector 202. In this logic, the symbol "←" stores a result, the symbol "∨" is a Boolean OR operation, the symbol"∧" is a Boolean AND operation, the symbol "⊕" is a Boolean XOR operation, the overline "‾" indicates bit negation, the brackets "[ ]" indicate a bit position, and the parentheses indicate a precedence order.

Block 300 represents SLAST being computed according to the following:

$SLAST \leftarrow \overline{I[13]} \vee I[14] \vee I[15]$

Figure 4:
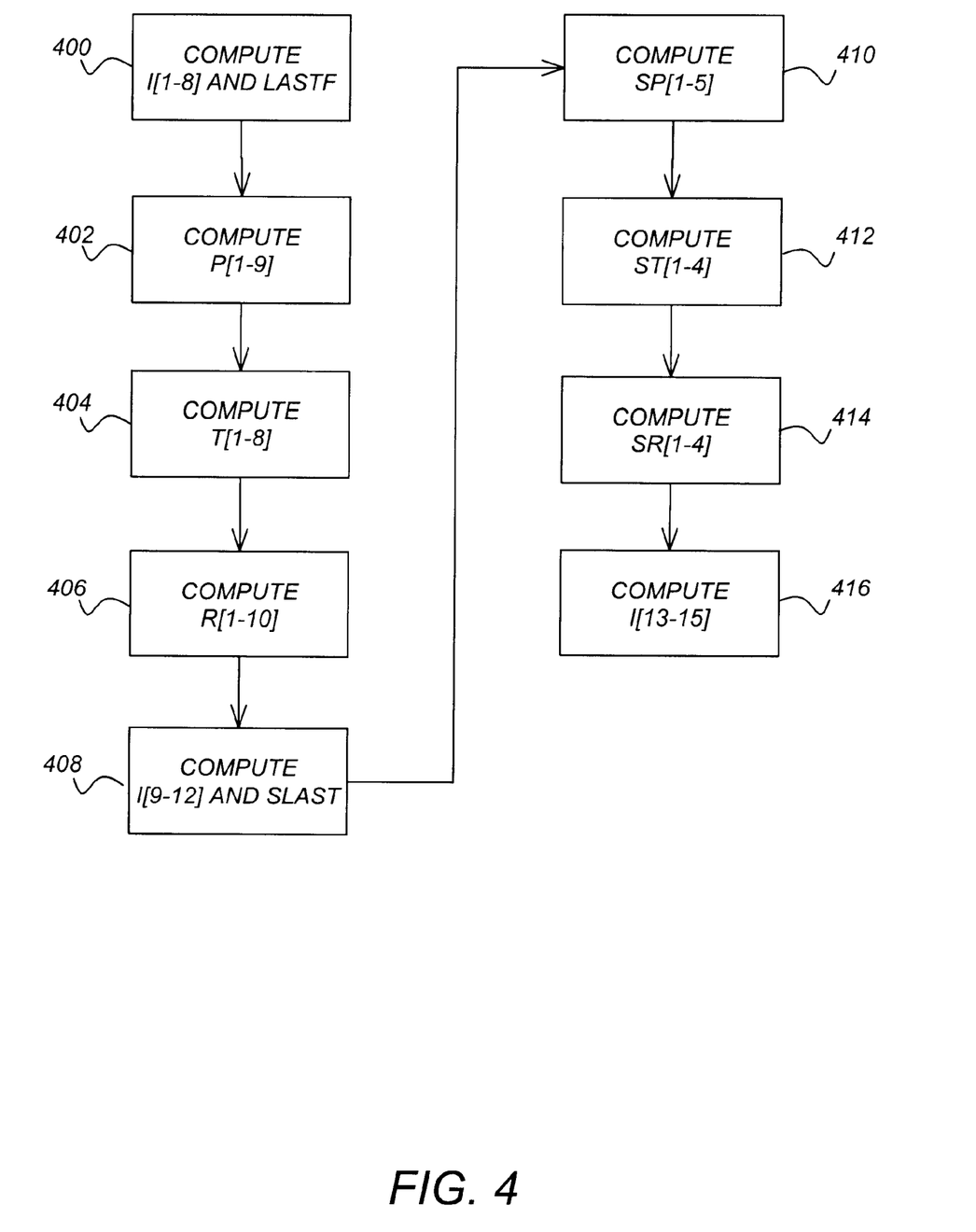
FIG. 4 is a flow chart illustrating the decoding logic performed by a servo controller during the reading of a servo sector in the preferred embodiment of the present invention.

Block 302 represents SENC[9,2,3,4,10] being computed according to the following:

$SENC[9] \leftarrow I[9]$
$SENC[2] \leftarrow I[9] \wedge I[10]$
$SENC[3] \leftarrow I[10] \oplus I[11]$
$SENC[4] \leftarrow I[11] \oplus I[12]$
$SENC[10] \leftarrow I[12] \oplus SLAST$ Block 304 represents SR[1–5] being computed according to the following:

$SR[1] \leftarrow 0$
$SR[2] \leftarrow (\overline{I[13]} \oplus I[14] \oplus I[15]) \vee \overline{I[14]} \vee \overline{I[15]}$
$SR[3] \leftarrow I[13] \oplus I[14]$
$SR[4] \leftarrow I[13]$
$SR[5] \leftarrow \overline{I[13]} \vee \overline{I[14]} \vee \overline{I[15]}$ Block 306 represents ST[1–4] being computed according to the following:

$ST[1] \leftarrow I[10] \wedge I[11] \wedge I[12]$
$ST[2] \leftarrow \overline{I[10]} \wedge I[11] \wedge I[12]$
$ST[3] \leftarrow \overline{I[11]} \wedge I[12]$
$ST[4] \leftarrow \overline{I[12]}$ Block 308 represents SP[1–5] being computed according to the following:

$SP[1] \leftarrow (ST[1] \wedge SR[4]) \vee (\overline{ST[1]} \wedge SR[1])$
$SP[2] \leftarrow (ST[2] \wedge SR[4]) \vee (\overline{ST[2]} \wedge SR[2])$
$SP[3] \leftarrow (ST[3] \wedge SR[4]) \vee (\overline{ST[3]} \wedge SR[3])$
$SP[4] \leftarrow (ST[1] \wedge SR[1]) \vee (ST[2] \wedge SR[2]) \vee (ST[3] \wedge SR[3]) \vee (ST[4] \wedge SR[4])$
$SP[5] \leftarrow SR[5]$ Block 310 represents SENC[6,7,8,2,5] being computed according to the following:

$SENC[6] \leftarrow (SLAST \wedge (SP[1] \oplus SENC[9])) \vee (\overline{SLAST} \wedge SENC[9])$
$SENC[7] \leftarrow (SLAST \wedge (SP[2] \oplus SENC[2])) \vee (\overline{SLAST} \wedge SENC[2])$
$SENC[8] \leftarrow (SLAST \wedge (SP[3] \oplus SENC[3])) \vee (\overline{SLAST} \wedge SENC[3])$
$SENC[1] \leftarrow (SLAST \wedge (SP[4] \oplus SENC[4])) \vee (\overline{SLAST} \wedge SENC[4])$
$SENC[5] \leftarrow (SLAST \wedge (SP[5] \oplus SENC[10])) \wedge (\overline{SLAST} \wedge SENC[10])$ Block 312 represents LAST being computed according to the following:

$LAST \leftarrow I[9] \vee I[10] \vee I[11] \vee I[12] \vee I[13] \vee I[14] \vee I[15]$ Block 314 represents ENC[1–9] being computed according to the following:

$ENC[1] \leftarrow I[1]$
$ENC[2] \leftarrow I[1] \oplus I[2]$
$ENC[3] \leftarrow I[2] \oplus I[3]$
$ENC[4] \leftarrow I[3] \oplus I[4]$
$ENC[5] \leftarrow I[4] \oplus I[5]$
$ENC[6] \leftarrow I[5] \oplus I[6]$
$ENC[7] \leftarrow I[6] \oplus I[7]$
$ENC[8] \leftarrow I[7] \oplus I[8]$
$ENC[9] \leftarrow I[8] \oplus LAST$ Block 316 represents T[1–8] being computed according to the following:

$T[1] \leftarrow I[2] \wedge I[3] \wedge I[4] \wedge I[5] \wedge I[6] \wedge I[7] \wedge I[8]$
$T[2] \leftarrow \overline{I[2]} \wedge I[3] \wedge I[4] \wedge I[5] \wedge I[6] \wedge I[7] \wedge I[8]$
$T[3] \leftarrow \overline{I[3]} \wedge I[4] \wedge I[5] \wedge I[6] \wedge I[7] \wedge I[8]$ $T[4] \leftarrow \overline{I[4]} \wedge I[5] \wedge I[6] \wedge I[7] \wedge I[8] \wedge$
$T[5] \leftarrow \overline{I[5]} \wedge I[6] \wedge I[7] \wedge I[8]$
$T[6] \leftarrow \overline{I[6]} \wedge I[7] \wedge I[8]$
$T[7] \leftarrow \overline{I[7]} \wedge I[8]$ $T[8] \leftarrow \overline{I[8]}$ Block 318 represents P[1–10] being computed according to the following:

$P[1] \leftarrow (T[1] \wedge SENC[9]) \vee (\overline{T[1]} \wedge SENC[1])$
$P[2] \leftarrow (T[2] \wedge SENC[9]) \vee (\overline{T[2]} \wedge SENC[2])$
$P[3] \leftarrow (T[3] \wedge SENC[9]) \vee (\overline{T[3]} \wedge SENC[3])$
$P[4] \leftarrow (T[4] \wedge SENC[9]) \vee (\overline{T[4]} \wedge SENC[4])$
$P[5] \leftarrow (T[5] \wedge SENC[9]) \vee (\overline{T[5]} \wedge SENC[5])$
$P[6] \leftarrow (T[6] \wedge SENC[9]) \vee (\overline{T[6]} \wedge SENC[6])$
$P[7] \leftarrow (T[7] \wedge SENC[9]) \vee (\overline{T[7]} \wedge SENC[7])$
$P[8] \leftarrow (T[8] \wedge SENC[9]) \vee (\overline{T[8]} \wedge SENC[8])$ $P[9] \leftarrow SENC[10]$
$P[10] \leftarrow (T[1] \wedge SENC[1]) \vee (T[2] \wedge SENC[2])$
$\vee (T[3] \wedge SENC[3]) \vee (T[4] \wedge SENC[4])$
$\vee (T[5] \wedge SENC[5]) \vee (T[6] \wedge SENC[6])$
$\vee (T[7] \wedge SENC[7]) \vee (T[8] \wedge SENC[8])$ Block 320 represents ENC[10–19] being computed according to the following:

$ENC[10] \leftarrow (LAST \wedge (P[1] \oplus ENC[1])) \vee (\overline{LAST} \wedge ENC[1])$
$ENC[11] \leftarrow (LAST \wedge (P[2] \oplus ENC[2])) \vee (\overline{LAST} \wedge ENC[2])$
$ENC[12] \leftarrow (LAST \wedge (P[3] \oplus ENC[3])) \vee (\overline{LAST} \wedge ENC[3])$
$ENC[13] \leftarrow (LAST \wedge (P[4] \oplus ENC[4])) \vee (\overline{LAST} \wedge ENC[4])$
$ENC[14] \leftarrow (LAST \wedge (P[5] \oplus ENC[5])) \vee (\overline{LAST} \wedge ENC[5])$
$ENC[15] \leftarrow (LAST \wedge (P[6] \oplus ENC[6])) \vee (\overline{LAST} \wedge ENC[6])$
$ENC[16] \leftarrow (LAST \wedge (P[7] \oplus ENC[7])) \vee (\overline{LAST} \wedge ENC[7])$
$ENC[17] \leftarrow (LAST \wedge (P[8] \oplus ENC[8])) \vee (\overline{LAST} \wedge ENC[8])$
$ENC[18] \leftarrow (LAST \wedge (P[9] \oplus ENC[9])) \vee (\overline{LAST} \wedge ENC[9])$
$ENC[19] \leftarrow LAST \wedge P[10]$ Decoding Logic FIG. 4 is a flow chart illustrating the decoding logic performed by the servo controller 112 during the reading of the servo sector 202 in the preferred embodiment of the present invention. This logic is described in the format of Boolean logic, wherein the decoding logic receives a 19-bit vector (B[1], B[2], ..., B[19]) that represents the TID field 212 of the servo sector 202 and produces as output a 15-bit vector (I[1], I[2], ..., I[15]) that represents the track identifier. In this logic, the symbol "←" stores a result, the symbol "∨" is a Boolean OR operation, the symbol "∧" is a Boolean AND operation, the symbol "⊕" is a Boolean XOR operation, the overline "ˉ" indicates bit negation, the brackets "[ ]" indicate a bit position, and the parentheses indicate a precedence order.

Block 400 represents I[1–8] and LASTF being computed according to the following:

$I[1] \leftarrow B[1]$ $I[2] \leftarrow I[1] \oplus B[2]$ $I[3] \leftarrow I[2] \oplus B[3]$ $I[4] \leftarrow I[3] \oplus B[4]$ $I[5] \leftarrow I[4] \oplus B[5]$ $I[6] \leftarrow I[5] \oplus B[6]$ $I[7] \leftarrow I[6] \oplus B[7]$ $I[8] \leftarrow I[7] \oplus B[8]$ $LAST \leftarrow I[8] \oplus B[9]$ Block 402 represents P[1–9] being computed according to the following:

$P[1] \leftarrow B[1] \oplus B[10]$ $P[2] \leftarrow B[2] \oplus B[11]$ $P[3] \leftarrow B[3] \oplus B[12]$ $P[4] \leftarrow B[4] \oplus B[13]$ $P[5] \leftarrow B[5] \oplus B[14]$ $P[6] \leftarrow B[6] \oplus B[15]$ $P[7] \leftarrow B[7] \oplus B[16]$ $P[8] \leftarrow B[8] \oplus B[17]$ $P[9] \leftarrow B[9] \oplus B[18]$ Block 404 represents T[1–8] being computed according to the following:

$T[1] \leftarrow I[2] \wedge I[3] \wedge I[4] \wedge I[5] \wedge I[6] \wedge I[7] \wedge I[8]$
$T[2] \leftarrow \overline{I[2]} \wedge I[3] \wedge I[4] \wedge I[5] \wedge I[6] \wedge I[7] \wedge I[8]$
$T[3] \leftarrow \overline{I[3]} \wedge I[4] \wedge I[5] \wedge I[6] \wedge I[7] \wedge I[8]$
$T[4] \leftarrow \overline{I[4]} \wedge I[5] \wedge I[6] \wedge I[7] \wedge I[8]$
$T[5] \leftarrow \overline{I[5]} \wedge I[6] \wedge I[7] \wedge I[8]$
$T[6] \leftarrow \overline{I[6]} \wedge I[7] \wedge I[8]$ $T[7] \leftarrow \overline{I[7]} I[8]$ $T[8] \leftarrow \overline{I[8]}$ Block 406 represents R[1–10] being computed according to the following:

$R[1] \leftarrow (P[1] \wedge T[1]) \vee (P[2] \wedge T[2]) \vee (P[3] \wedge T[3]) \vee (P[4] \wedge T[4])$
$\vee (P[5] \wedge T[5]) \vee (P[6] \wedge T[6]) \vee (P[7] \wedge T[7]) \vee (P[8] \wedge T[8])$
$R[2] \leftarrow (P[2] \wedge \overline{T[2]}) \vee (P[10] \wedge T[2])$
$R[3] \leftarrow (P[3] \wedge \overline{T[3]}) \vee (P[10] \wedge T[3])$
$R[4] \leftarrow (P[4] \wedge \overline{T[4]}) \vee (P[10] \wedge T[4])$ $R[5] \leftarrow P[9]$
$R[6] \leftarrow (P[6] \wedge \overline{T[6]}) \vee (P[10] \wedge T[6])$
$R[7] \leftarrow (P[7] \wedge \overline{T[7]}) \vee (P[10] \wedge T[7])$
$R[8] \leftarrow (P[8] \wedge \overline{T[8]}) \vee (P[10] \wedge T[8])$
$R[9] \leftarrow (P[1] \wedge \overline{T[1]}) \vee (P[10] \wedge T[1])$
$R[10] \leftarrow (P[5] \wedge \overline{T[5]}) \vee (P[10] \wedge T[5])$ Block 408 represents I[9–12] and SLAST being computed according to the following:

$I[9] \leftarrow LAST \wedge R[1]$
$I[10] \leftarrow LAST \wedge (I[9] \oplus R[2])$
$I[11] \leftarrow LAST \wedge (I[10] \oplus R[3])$
$I[12] \leftarrow LAST \wedge (I[11] \oplus R[4])$ $SLAST \leftarrow I[12] \oplus R[5]$ Block 410 represents SP[1–5] being computed according to the following:

$SP[1] \leftarrow R[1] \oplus R[6]$ $SP[2] \leftarrow R[2] \oplus R[7]$ $SP[3] \leftarrow R[3] \oplus R[8]$ $SP[4] \leftarrow R[4] \oplus R[9]$ $SP[5] \leftarrow R[5] \oplus R[10]$ Block 412 represents ST[1–4] being computed according to the following:

$ST[1] \leftarrow \overline{I[10]} \wedge I[11] \wedge I[12]$
$ST[2] \leftarrow \overline{I[10]} \wedge I[11] \wedge I[12]$
$ST[3] \leftarrow \overline{I[11]} \wedge I[12]$ $ST[4] \leftarrow \overline{I[12]}$ Block 414 represents SR[1–4] being computed according to the following:

$SR[1] \leftarrow (SP[2] \wedge \overline{ST[2]}) \vee (SP[4] \wedge ST[2])$
$SR[2] \leftarrow (SP[3] \wedge \overline{ST[3]}) \vee (SP[4] \wedge ST[3])$
$SR[3] \leftarrow (SP[1] \wedge ST[1]) \vee (SP[2] \wedge ST[2])$
$\vee (SP[3] \wedge ST[3]) \vee (SP[4] \wedge ST[4])$ $SR[4] \leftarrow SP[5]$ Block 416 represents I[13–15] being computed according to the following:

$I[13] \leftarrow \text{LAST} \wedge \text{SLAST} \wedge SR[3]$
$I[14] \leftarrow \text{LAST} \wedge \text{SLAST} \wedge (SR[2] \oplus SR[3])$
$I[15] \leftarrow \text{LAST} \wedge \text{SLAST} \wedge (SR[1] \oplus SR[2] \oplus SR[3] \oplus SR[4])$ Encoding/Decoding Example Using the above-identified encoding and decoding logic, consider an example of a set of four tracks A, B, C, and D having the following track identifiers and SITB-encoded TIDs:

| Track | Track Identifier (15 bit) | SITB-Encoded TID (19 bit) |
|---|---|---|
| A | 000000000000000 | 0000000000000000000 |
| B | 000000000000001 | 0000000010000000000 |
| C | 000000000000010 | 0000000010000000001 |
| D | 000000000000011 | 0000000010000001001 |

It can be seen from this example that the adjacent SITB-encoded TIDs 212 (i.e., tracks A and B, B and C, and C and D) are at a distance of 1, while the non-adjacent SITB-encoded TIDs 212 (i.e., tracks A and C, A and D, and B and D) are at a distance of at least 2.

Conclusion

This concludes the description of the preferred embodiment of the present invention. Generally, the preferred embodiment of the present invention is implemented as logic, circuits, or programming within the servo controller 112, a servo-writer, a tester, or some other device. This logic, circuits, or programming is embodied in or retrievable from a device, medium, or carrier. Moreover, this logic, circuits, or programming, when performed, executed, and/or interpreted, cause the device to perform the steps necessary to implement and/or use the present invention.

Thus, the present invention may be implemented as a method, apparatus, or article of manufacture using standard engineering and/or programming techniques to produce hardware, firmware, software, or any combination thereof. The term "article of manufacture" as used herein is intended to encompass logic, circuits or programming embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different data storage devices. For example, any type of rotating data storage device, such as a magnetic, optical, or other device, could benefit from the present invention. Moreover, different electronics or logic could be used to implement the present invention.

Moreover, the particular SITB codes described herein are provided for illustrative purposes only. Those skilled in the art will recognize that different SITB codes, different encoding logic, and different decoding logic could be used without departing from the scope of the present invention. Specifically, many SITB codes could be substituted for the ones described herein.

In conclusion, the present invention uses a "snake-in-the-box" (SITB) code to encode a track identifier (TID) in a servo sector of a disk drive to identify a particular track on the disk surface. The SITB code describes the longest possible vector that can fit into a finite space, and comprises a type of difference-preserving code. When an SITB code is used for the TID, any single bit error in the TID will be detected. The Hamming distance for TIDs of adjacent tracks is 1 with a SITB code, as with a Gray code. However, for TIDs of tracks that are not adjacent, the Hamming distance is at least 2 with a SITB code.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for encoding a track identifier for servo control in a data storage device, comprising:
    (a) encoding the track identifier as a snake-in-the-box code; and
    (b) storing the encoded track identifier as servo information on the data storage device.

2. The method of claim 1, wherein the encoded track identifier contains bits identifying a track position, as well as bits for error detection.

3. The method of claim 2, wherein the snake-in-the-box code allows for detection of one or more errors in the encoded track identifier.

4. The method of claim 1, wherein adjacent ones of the encoded track identifiers are at a Hamming distance of exactly 1 and non-adjacent ones of the encoded track identifiers are at a Hamming distance of at least 2.

5. The method of claim 1, further comprising mapping k bits of the track identifier into n bits of a track identifier field in a logically efficient way, such that a result is the snake-in-the-box code.

6. The method of claim 5, wherein an input to the encoding step is given by a k-bit vector (I[1], I[2], . . . , I[k]) that represents the track identifier and an output from the encoding step is an n-bit vector (ENC[1], ENC[2], . . . , ENC[n]) that represents the track identifier field.

7. The method of claim 6, wherein k=15 and n=19.

8. The method of claim 7, wherein the encoding step comprises the steps of:
    (1) computing SLAST according to the following:
    $SLAST \leftarrow \overline{I[13]} \vee I[14] \vee I[15]$ (2) computing SENC[9,2,3,4,10] according to the following:

$SENC[9] \leftarrow I[9]$
    $SENC[2] \leftarrow I[9] \wedge I[10]$ $SENC[3] \leftarrow I[10] \oplus I[11]$ $SENC[4] \leftarrow I[11] \oplus I[12]$ $SENC[10] \leftarrow I[12] \oplus SLAST$ (3) computing SR[1–5] according to the following:

$SR[1] \leftarrow 0$
$SR[2] \leftarrow (\overline{I[13]} \oplus I[14] \oplus I[15]) \vee \overline{I[14]} \vee \overline{I[15]}$ $SR[3] \leftarrow I[13] \oplus I[14]$ $SR[4] \leftarrow I[13]$
$SR[5] \leftarrow \overline{I[13]} \vee \overline{I[14]} \vee \overline{I[15]}$ (4) computing ST[1–4] according to the following:
$ST[1] \leftarrow I[10] \wedge I[11] \wedge I[12]$
$ST[2] \leftarrow \overline{I[10]} \wedge I[11] \wedge I[12]$
$ST[3] \leftarrow \overline{I[11]} \wedge I[12]$ $ST[4] \leftarrow \overline{I[12]}$ (5) computing SP[1–5] according to the following:
$SP[1] \leftarrow (ST[1] \wedge SR[4]) \vee (\overline{ST[1]} \wedge SR[1])$
$SP[2] \leftarrow (ST[2] \wedge SR[4]) \vee (\overline{ST[2]} \wedge SR[2])$
$SP[3] \leftarrow (ST[3] \wedge SR[4]) \vee (\overline{ST[3]} \wedge SR[3])$
$SP[4] \leftarrow (ST[1] \wedge SR[1]) \vee (ST[2] \wedge SR[2])$
$\vee (ST[3] \wedge SR[3]) \vee (ST[4] \wedge SR[4])$ $SP[5] \leftarrow SR[5]$ (6) computing SENC[6,7,8,2,5] according to the following:
$SENC[6] \leftarrow (SLAST \wedge (SP[1] \oplus SENC[9])) \vee (\overline{SLAST} \wedge SENC[9])$
$SENC[7] \leftarrow (SLAST \wedge (SP[2] \oplus SENC[2])) \vee (\overline{SLAST} \wedge SENC[2])$
$SENC[8] \leftarrow (SLAST \wedge (SP[3] \oplus SENC[3])) \vee (\overline{SLAST} \wedge SENC[3])$
$SENC[1] \leftarrow (SLAST \wedge (SP[4] \oplus SENC[4])) \vee (\overline{SLAST} \wedge SENC[4])$
$SENC[5] \leftarrow (SLAST \wedge (SP[5] \oplus SENC[10])) \vee (\overline{SLAST} \wedge SENC[10])$ (7) computing LAST according to the following:
$LAST \leftarrow I[9] \vee I[10] \vee I[11] \vee I[12] \vee I[13] \vee I[14] \vee I[15]$ (8) computing ENC[1–9] according to the following:

$ENC[1] \leftarrow I[1]$ $ENC[2] \leftarrow I[1] \oplus I[2]$ $ENC[3] \leftarrow I[2] \oplus I[3]$ $ENC[4] \leftarrow I[3] \oplus I[4]$ $ENC[5] \leftarrow I[4] \oplus I[5]$ $ENC[6] \leftarrow I[5] \oplus I[6]$ $ENC[7] \leftarrow I[6] \oplus I[7]$ $ENC[8] \leftarrow I[7] \oplus I[8]$ $ENC[9] \leftarrow I[8] \oplus LAST$ (9) computing T[1–8] according to the following:
$T[1] \leftarrow I[2] \wedge I[3] \wedge I[4] \wedge I[5] \wedge I[6] \wedge I[7] \wedge I[8]$
$T[2] \leftarrow \overline{I[2]} \wedge I[3] \wedge I[4] \wedge I[5] \wedge I[6] \wedge I[7] \wedge I[8]$
$T[3] \leftarrow \overline{I[3]} \wedge I[4] \wedge I[5] \wedge I[6] \wedge I[7] \wedge I[8]$
$T[4] \leftarrow \overline{I[4]} \wedge I[5] \wedge I[6] \wedge I[7] \wedge I[8]$
$T[5] \leftarrow \overline{I[5]} \wedge I[6] \wedge I[7] \wedge I[8]$
$T[6] \leftarrow \overline{I[6]} \wedge I[7] \wedge I[8]$ $T[7] \leftarrow \overline{I[7]} \wedge I[8]$ $T[8] \leftarrow \overline{I[8]}$ (10) computing P[1–10] according to the following:
$P[1] \leftarrow (T[1] \wedge SENC[9]) \vee (\overline{T[1]} \wedge SENC[1])$
$P[2] \leftarrow (T[2] \wedge SENC[9]) \vee (\overline{T[2]} \wedge SENC[2])$
$P[3] \leftarrow (T[3] \wedge SENC[9]) \vee (\overline{T[3]} \wedge SENC[3])$
$P[4] \leftarrow (T[4] \wedge SENC[9]) \vee (\overline{T[4]} \wedge SENC[4])$
$P[5] \leftarrow (T[5] \wedge SENC[9]) \vee (\overline{T[5]} \wedge SENC[5])$
$P[6] \leftarrow (T[6] \wedge SENC[9]) \vee (\overline{T[6]} \wedge SENC[6])$
$P[7] \leftarrow (T[7] \wedge SENC[9]) \vee (\overline{T[7]} \wedge SENC[7])$
$P[8] \leftarrow (T[8] \wedge SENC[9]) \vee (\overline{T[8]} \wedge SENC[8])$ $P[9] \leftarrow SENC[10]$
$P[10] \leftarrow (T[1] \wedge SENC[1]) \vee (T[2] \wedge SENC[2])$
$\vee (T[3] \wedge SENC[3]) \vee (T[4] \wedge SENC[4])$
$\vee (T[5] \wedge SENC[5]) \vee (T[6] \wedge SENC[6])$
$\vee (T[7] \wedge SENC[7]) \vee (T[8] \wedge SENC[8])$ (11) computing ENC[10–19] according to the following:
$ENC[10] \leftarrow (LAST \wedge (P[1] \oplus ENC[1])) \vee (\overline{LAST} \wedge ENC[1])$
$ENC[11] \leftarrow (LAST \wedge (P[2] \oplus ENC[2])) \vee (\overline{LAST} \wedge ENC[2])$
$ENC[12] \leftarrow (LAST \wedge (P[3] \oplus ENC[3])) \vee (\overline{LAST} \wedge ENC[3])$
$ENC[13] \leftarrow (LAST \wedge (P[4] \oplus ENC[4])) \vee (\overline{LAST} \wedge ENC[4])$
$ENC[14] \leftarrow (LAST \wedge (P[5] \oplus ENC[5])) \vee (\overline{LAST} \wedge ENC[5])$
$ENC[15] \leftarrow (LAST \wedge (P[6] \oplus ENC[6])) \vee (\overline{LAST} \wedge ENC[6])$
$ENC[16] \leftarrow (LAST \wedge (P[7] \oplus ENC[7])) \vee (\overline{LAST} \wedge ENC[7])$
$ENC[17] \leftarrow (LAST \wedge (P[8] \oplus ENC[8])) \vee (\overline{LAST} \wedge ENC[8])$
$ENC[18] \leftarrow (LAST \wedge (P[9] \oplus ENC[9])) \vee (\overline{LAST} \wedge ENC[9])$
$ENC[19] \leftarrow LAST \wedge P[10]$ (12) wherein the symbol "←" stores a result, the symbol "∨" is a Boolean OR operation, the symbol "∧" is a Boolean AND operation, the symbol "⊕" is a Boolean XOR operation, the overline "" indicates bit negation, the brackets "[ ]" indicate a bit position, and the parentheses indicate a precedence order.

9. A method for decoding a track identifier for servo control in a data storage device, comprising:

(a) accessing an encoded track identifier stored as servo information on the data storage device; and (b) decoding the track identifier as a snake-in-the-box code.

10. The method of claim 9, wherein the encoded track identifier contains bits identifying a track position, as well as bits for error detection.

11. The method of claim 9, wherein the snake-in-the-box code allows for detection of one or more errors in the encoded track identifier.

12. The method of claim 9, wherein adjacent ones of the encoded track identifiers are at a Hamming distance of exactly 1 and non-adjacent ones of the encoded track identifiers are at a Hamming distance of at least 2.

13. The method of claim 9, wherein the decoding step further comprises mapping n bits of a track identifier field into k bits of the encoded track identifier in a logically efficient way, such that a result is the track identifier.

14. The method of claim 13, wherein an input to the decoding step is given by a n-bit vector (B[1], B[2], . . . , B[n]) that represents the track identifier field and an output from the decoding step is given by a k-bit vector (I[1], I[2], . . . , I[k]) that represents the track identifier.

15. The method of claim 14, wherein n=19 and k=15.

16. The method of claim 15, wherein the decoding step comprises the steps of:

(1) computing I[1–8] and LASTF according to the following:

$I[1] \leftarrow B[1]$ $I[2] \leftarrow I[1] \oplus B[2]$ $I[3] \leftarrow I[2] \oplus B[3]$ $I[4] \leftarrow I[3] \oplus B[4]$ $I[5] \leftarrow I[4] \oplus B[5]$ $I[6] \leftarrow I[5] \oplus B[6]$ $I[7] \leftarrow I[6] \oplus B[7]$ $I[8] \leftarrow I[7] \oplus B[8]$ $LASTF \leftarrow I[8] \oplus B[9]$ (2) computing P[1–9] according to the following:

$P[1] \leftarrow B[1] \oplus B[10]$ $P[2] \leftarrow B[2] \oplus B[11]$ $P[3] \leftarrow B[3] \oplus B[12]$ $P[4] \leftarrow B[4] \oplus B[13]$ $P[5] \leftarrow B[5] \oplus B[14]$ $P[6] \leftarrow B[6] \oplus B[15]$ $P[7] \leftarrow B[7] \oplus B[16]$ $P[8] \leftarrow B[8] \oplus B[17]$ $P[9] \leftarrow B[9] \oplus B[18]$ (3) computing T[1–8] according to the following:

$T[1] \leftarrow I[2] \wedge I[3] \wedge I[4] \wedge I[5] \wedge I[6] \wedge I[7] \wedge I[8]$
$T[2] \leftarrow \overline{I[2]} \wedge I[3] \wedge I[4] \wedge I[5] \wedge I[6] \wedge I[7] \wedge I[8]$
$T[3] \leftarrow \overline{I[3]} \wedge I[4] \wedge I[5] \wedge I[6] \wedge I[7] \wedge I[8]$
$T[4] \leftarrow \overline{I[4]} \wedge I[5] \wedge I[6] \wedge I[7] \wedge I[8]$
$T[5] \leftarrow \overline{I[5]} \wedge I[6] \wedge I[7] \wedge I[8]$
$T[6] \leftarrow \overline{I[6]} \wedge I[7] \wedge I[8]$
$T[7] \leftarrow \overline{I[7]} \wedge I[8]$ $T[8] \leftarrow \overline{I[8]}$ (4) computing R[1–10] according to the following:

$R[1] \leftarrow (P[1] \wedge T[1]) \vee (P[2] \wedge T[2]) \vee (P[3] \wedge T[3]) \vee (P[4] \wedge T[4])$
$\vee (P[5] \wedge T[5]) \vee (P[6] \wedge T[6]) \vee (P[7] \wedge T[7]) \vee (P[8] \wedge T[8])$
$R[2] \leftarrow (P[2] \wedge \overline{T[2]}) \vee (P[10] \wedge T[2])$
$R[3] \leftarrow (P[3] \wedge \overline{T[3]}) \vee (P[10] \wedge T[3])$
$R[4] \leftarrow (P[4] \wedge \overline{T[4]}) \vee (P[10] \wedge T[4])$ $R[5] \leftarrow P[9]$
$R[6] \leftarrow (P[6] \wedge \overline{T[6]}) \vee (P[10] \wedge T[6])$
$R[7] \leftarrow (P[7] \wedge \overline{T[7]}) \vee (P[10] \wedge T[7])$
$R[8] \leftarrow (P[8] \wedge \overline{T[8]}) \vee (P[10] \wedge T[8])$
$R[9] \leftarrow (P[1] \wedge \overline{T[1]}) \vee (P[10] \wedge T[1])$
$R[10] \leftarrow (P[5] \wedge \overline{T[5]}) \vee (P[10] \wedge T[5])$ (5) computing I[9–12] and SLAST according to the following:

$I[9] \leftarrow LAST \wedge R[1]$
$I[10] \leftarrow LAST \wedge (I[9] \oplus R[2])$
$I[11] \leftarrow LAST \wedge (I[10] \oplus R[3])$
$I[12] \leftarrow LAST \wedge (I[11] \oplus R[4])$ $SLAST \leftarrow I[12] \oplus R[5]$ (6) computing SP[1–5] according to the following:

$SP[1] \leftarrow R[1] \oplus R[6]$ $SP[2] \leftarrow R[2] \oplus R[7]$ $SP[3] \leftarrow R[3] \oplus R[8]$ $SP[4] \leftarrow R[4] \oplus R[9]$ $SP[5] \leftarrow R[5] \oplus R[10]$ (7) computing ST[1–4] according to the following:

$ST[1] \leftarrow I[10] \wedge I[11] \wedge I[12]$
$ST[2] \leftarrow \overline{I[10]} \wedge I[11] \wedge I[12]$
$ST[3] \leftarrow \overline{I[11]} \wedge I[12]$ $ST[4] \leftarrow \overline{I[12]}$ (8) computing SR[1–4] according to the following:

$SR[1] \leftarrow (SP[2] \wedge \overline{ST[2]}) \vee (SP[4] \wedge ST[2])$
$SR[2] \leftarrow (SP[3] \wedge \overline{ST[3]}) \vee (SP[4] \wedge ST[3])$
$SR[3] \leftarrow (SP[1] \wedge ST[1]) \vee (SP[2] \wedge ST[2])$
$\vee (SP[3] \wedge ST[3]) \vee (SP[4] \wedge ST[4])$ $SR[4] \leftarrow SP[5]$ (9) computing I[13–15] according to the following:

$I[13] \leftarrow LAST \wedge SLAST \wedge SR[3]$
$I[14] \leftarrow LAST \wedge SLAST \wedge (SR[2] \oplus SR[3])$
$I[15] \leftarrow LAST \wedge SLAST \wedge (SR[1] \oplus SR[2] \oplus SR[3] \oplus SR[4])$ (10) wherein the symbol "←" stores a result, the symbol "∨" is a Boolean OR operation, the symbol "∧" is a Boolean AND operation, the symbol "⊕" is a Boolean XOR operation, the overline "" indicates bit negation, the brackets "[ ]" indicate a bit position, and the parentheses indicate a precedence order.

17. An apparatus for encoding a track identifier for servo control in a data storage device, comprising:
   (a) means for encoding the track identifier as a snake-in-the-box code; and
   (b) means for storing the encoded track identifier as servo information on the data storage device.

18. The apparatus of claim 17, wherein the encoded track identifier contains bits identifying a track position, as well as bits for error detection.

19. The apparatus of claim 18, wherein the snake-in-the-box code allows for detection of one or more errors in the encoded track identifier.

20. The apparatus of claim 17, wherein adjacent ones of the encoded track identifiers are at a Hamming distance of exactly 1 and non-adjacent ones of the encoded track identifiers are at a Hamming distance of at least 2.

21. The apparatus of claim 17, further comprising means for mapping k bits of the track identifier into n bits of a track identifier field in a logically efficient way, such that a result is the snake-in-the-box code.

22. The apparatus of claim 21, wherein an input to the means for encoding is given by a k-bit vector (I[1], I[2], ..., I[k]) that represents the track identifier and an output from the means for encoding is an n-bit vector (ENC[1], ENC[2], ..., ENC[n]) that represents the track identifier field.

23. The apparatus of claim 22, wherein k=15 and n=19.

24. The apparatus of claim 23, wherein the means for encoding comprises:
   (1) means for computing SLAST according to the following:

$SLAST \leftarrow \overline{I[13]} \vee I[14] \vee I[15]$ (2) means for computing SENC[9,2,3,4,10] according to the following:

$SENC[9] \leftarrow I[9]$
$SENC[2] \leftarrow I[9] \wedge I[10]$
$SENC[3] \leftarrow I[10] \oplus I[11]$
$SENC[4] \leftarrow I[11] \oplus I[12]$
$SENC[10] \leftarrow I[12] \oplus SLAST$ (3) means for computing SR[1–5] according to the following:

$SR[1] \leftarrow 0$
$SR[2] \leftarrow (\overline{I[13]} \oplus I[14] \oplus I[15]) \vee I[14] \vee I[15]$
$SR[3] \leftarrow I[13] \oplus I[14]$
$SR[4] \leftarrow I[13]$
$SR[5] \leftarrow \overline{I[13]} \vee I[14] \vee I[15]$ (4) means for computing ST[1–4] according to the following:

$ST[1] \leftarrow I[10] \wedge I[11] \wedge I[12]$
$ST[2] \leftarrow \overline{I[10]} \wedge I[11] \wedge I[12]$
$ST[3] \leftarrow \overline{I[11]} \wedge I[12]$
$ST[4] \leftarrow \overline{I[12]}$ (5) means for computing SP[1–5] according to the following:

$SP[1] \leftarrow (ST[1] \wedge SR[4]) \vee (\overline{ST[1]} \wedge SR[1])$
$SP[2] \leftarrow (ST[2] \wedge SR[4]) \vee (\overline{ST[2]} \wedge SR[2])$
$SP[3] \leftarrow (ST[3] \wedge SR[4]) \vee (\overline{ST[3]} \wedge SR[3])$
$SP[4] \leftarrow (ST[1] \wedge SR[1]) \vee (ST[2] \wedge SR[2])$
$\vee (ST[3] \wedge SR[3]) \vee (ST[4] \wedge SR[4])$ $SP[5] \leftarrow SR[5]$ (6) means for computing SENC[6,7,8,2,5] according to the following:

$SENC[6] \leftarrow (SLAST \wedge (SP[1] \oplus SENC[9])) \vee (\overline{SLAST} \wedge SENC[9])$
$SENC[7] \leftarrow (SLAST \wedge (SP[2] \oplus SENC[2])) \vee (\overline{SLAST} \wedge SENC[2])$
$SENC[8] \leftarrow (SLAST \wedge (SP[3] \oplus SENC[3])) \vee (\overline{SLAST} \wedge SENC[3])$ (7)
$SENC[1] \leftarrow (SLAST \wedge (SP[4] \oplus SENC[4])) \vee (\overline{SLAST} \wedge SENC[4])$
$SENC[5] \leftarrow (SLAST \wedge (SP[5] \oplus SENC[10])) \vee (\overline{SLAST} \wedge SENC[10])$ (7) means for computing LAST according to the following:

$LAST \leftarrow I[9] \vee I[10] \vee I[11] \vee I[12] \vee I[13] \vee I[14] \vee I[15]$ (8) means for computing ENC[1–9] according to the following:

$ENC[1] \leftarrow I[1]$
$ENC[2] \leftarrow I[1] \oplus I[2]$
$ENC[3] \leftarrow I[2] \oplus I[3]$
$ENC[4] \leftarrow I[3] \oplus I[4]$
$ENC[5] \leftarrow I[4] \oplus I[5]$
$ENC[6] \leftarrow I[5] \oplus I[6]$
$ENC[7] \leftarrow I[6] \oplus I[7]$
$ENC[8] \leftarrow I[7] \oplus I[8]$
$ENC[9] \leftarrow I[8] \oplus LAST$ (9) means for computing T[1–8] according to the following:

$T[1] \leftarrow I[2] \wedge I[3] \wedge I[4] \wedge I[5] \wedge I[6] \wedge I[7] \wedge I[8]$
$T[2] \leftarrow \overline{I[2]} \wedge I[3] \wedge I[4] \wedge I[5] \wedge I[6] \wedge I[7] \wedge I[8]$
$T[3] \leftarrow \overline{I[3]} \wedge I[4] \wedge I[5] \wedge I[6] \wedge I[7] \wedge I[8]$
$T[4] \leftarrow \overline{I[4]} \wedge I[5] \wedge I[6] \wedge I[7] \wedge I[8]$
$T[5] \leftarrow \overline{I[5]} \wedge I[6] \wedge I[7] \wedge I[8]$
$T[6] \leftarrow \overline{I[6]} \wedge I[7] \wedge I[8]$
$T[7] \leftarrow \overline{I[7]} \wedge I[8]$
$T[8] \leftarrow \overline{I[8]}$ (10) means for computing P[1–10] according to the following:

$P[1] \leftarrow (T[1] \wedge SENC[9]) \vee (\overline{T[1]} \wedge SENC[1])$
$P[2] \leftarrow (T[2] \wedge SENC[9]) \vee (\overline{T[2]} \wedge SENC[2])$
$P[3] \leftarrow (T[3] \wedge SENC[9]) \vee (\overline{T[3]} \wedge SENC[3])$
$P[4] \leftarrow (T[4] \wedge SENC[9]) \vee (\overline{T[4]} \wedge SENC[4])$
$P[5] \leftarrow (T[5] \wedge SENC[9]) \vee (\overline{T[5]} \wedge SENC[5])$
$P[6] \leftarrow (T[6] \wedge SENC[9]) \vee (\overline{T[6]} \wedge SENC[6])$
$P[7] \leftarrow (T[7] \wedge SENC[9]) \vee (\overline{T[7]} \wedge SENC[7])$
$P[8] \leftarrow (T[8] \wedge SENC[9]) \vee (\overline{T[8]} \wedge SENC[8])$ $P[9] \leftarrow SENC[10]$
$P[10] \leftarrow (T[1] \wedge SENC[1]) \vee (T[2] \wedge SENC[2])$
$\vee (T[3] \wedge SENC[3]) \vee (T[4] \wedge SENC[4])$
$\vee (T[5] \wedge SENC[5]) \vee (T[6] \wedge SENC[6])$
$\vee (T[7] \wedge SENC[7]) \vee (T[8] \wedge SENC[8])$ (11) means for computing ENC[10–19] according to the following:

$ENC[10] \leftarrow (LAST \wedge (P[1] \oplus ENC[1])) \vee (\overline{LAST} \wedge ENC[1])$
$ENC[11] \leftarrow (LAST \wedge (P[2] \oplus ENC[2])) \vee (\overline{LAST} \wedge ENC[2])$
$ENC[12] \leftarrow (LAST \wedge (P[3] \oplus ENC[3])) \vee (\overline{LAST} \wedge ENC[3])$
$ENC[13] \leftarrow (LAST \wedge (P[4] \oplus ENC[4])) \vee (\overline{LAST} \wedge ENC[4])$
$ENC[14] \leftarrow (LAST \wedge (P[5] \oplus ENC[5])) \vee (\overline{LAST} \wedge ENC[5])$
$ENC[15] \leftarrow (LAST \wedge (P[6] \oplus ENC[6])) \vee (\overline{LAST} \wedge ENC[6])$
$ENC[16] \leftarrow (LAST \wedge (P[7] \oplus ENC[7])) \vee (\overline{LAST} \wedge ENC[7])$
$ENC[17] \leftarrow (LAST \wedge (P[8] \oplus ENC[8])) \vee (\overline{LAST} \wedge ENC[8])$
$ENC[18] \leftarrow (LAST \wedge (P[9] \oplus ENC[9])) \vee (\overline{LAST} \wedge ENC[9])$
$ENC[19] \leftarrow LAST \wedge P[10]$ (12) wherein the symbol "←" stores a result, the symbol "∨" is a Boolean OR operation, the symbol "∧" is a Boolean AND operation, the symbol "⊕" is a Boolean XOR operation, the overline "‾" indicates bit negation, the brackets "[ ]" indicate a bit position, and the parentheses indicate a precedence order.

25. An apparatus for decoding a track identifier for servo control in a data storage device, comprising:
(a) means for accessing an encoded track identifier stored as servo information on the data storage device; and
(b) means for decoding the track identifier as a snake-in-the-box code.

26. The apparatus of claim 25, wherein the encoded track identifier contains its identifying a track position, as well as bits for error detection.

27. The apparatus of claim 25, wherein the snake-in-the-box code allows for detection of one or more errors in the encoded track identifier.

28. The apparatus of claim 25, wherein adjacent ones of the encoded track identifiers are at a Hamming distance of exactly 1 and non-adjacent ones of the encoded track identifiers are at a Hamming distance of at least 2.

29. The apparatus of claim 25, wherein the means for decoding further comprises means for mapping n bits of a track identifier field into k bits of the encoded track identifier in a logically efficient way, such that a result is the track identifier.

30. The apparatus of claim 29, wherein an input to the means for decoding is given by a n-bit vector (B[1], B[2], ..., B[n]) that represents the track identifier field and an output from the means for decoding is given by a k-bit vector (I[1], I[2], ..., I[k]) that represents the track identifier.

31. The apparatus of claim 30, wherein n=19 and k=15.

32. The apparatus of claim 31, wherein the means for decoding comprises:

(1) means for computing I[1–8] and LASTF according to the following:

$I[1] \leftarrow B[1]$ $I[2] \leftarrow I[1] \oplus B[2]$ $I[3] \leftarrow I[2] \oplus B[3]$ $I[4] \leftarrow I[3] \oplus B[4]$ $I[5] \leftarrow I[4] \oplus B[5]$ $I[6] \leftarrow I[5] \oplus B[6]$ $I[7] \leftarrow I[6] \oplus B[7]$ $I[8] \leftarrow I[7] \oplus B[8]$ $LASTF \leftarrow I[8] \oplus B[9]$ (2) means for computing P[1–9] according to the following:

$P[1] \leftarrow B[1] \oplus B[10]$ $P[2] \leftarrow B[2] \oplus B[11]$ $P[3] \leftarrow B[3] \oplus B[12]$ $P[4] \leftarrow B[4] \oplus B[13]$ $P[5] \leftarrow B[5] \oplus B[14]$ $P[6] \leftarrow B[6] \oplus B[15]$ $P[7] \leftarrow B[7] \oplus B[16]$ $P[8] \leftarrow B[8] \oplus B[17]$ $P[9] \leftarrow B[9] \oplus B[18]$ (3) means for computing T[1–8] according to the following:

$T[1] \leftarrow I[2] \wedge I[3] \wedge I[4] \wedge I[5] \wedge I[6] \wedge I[7] \wedge I[8]$ $T[2] \leftarrow \overline{I[2]} \wedge I[3] \wedge I[4] \wedge I[5] \wedge I[6] \wedge I[7] \wedge I[8]$ $T[3] \leftarrow \overline{I[3]} \wedge I[4] \wedge I[5] \wedge I[6] \wedge I[7] \wedge I[8]$ $T[4] \leftarrow \overline{I[4]} \wedge I[5] \wedge I[6] \wedge I[7] \wedge I[8]$ $T[5] \leftarrow \overline{I[5]} \wedge I[6] \wedge I[7] \wedge I[8]$ $T[6] \leftarrow \overline{I[6]} \wedge I[7] \wedge I[8]$ $T[7] \leftarrow \overline{I[7]} \wedge I[8]$ $T[8] \leftarrow \overline{I[8]}$ (4) means for computing R[1–10] according to the following:

$R[1] \leftarrow (P[1] \wedge T[1]) \vee (P[2] \wedge T[2]) \vee (P[3] \wedge T[3]) \vee (P[4] \wedge T[4]) \vee (P[5] \wedge T[5]) \vee (P[6] \wedge T[6]) \vee (P[7] \wedge T[7]) \vee (P[8] \wedge T[8])$ $R[2] \leftarrow (P[2] \wedge \overline{T[2]}) \vee (P[10] \wedge T[2])$ $R[3] \leftarrow (P[3] \wedge \overline{T[3]}) \vee (P[10] \wedge T[3])$ $R[4] \leftarrow (P[4] \wedge \overline{T[4]}) \vee (P[10] \wedge T[4])$ $R[5] \leftarrow P[9]$ (5

$R[6] \leftarrow (P[6] \wedge \overline{T[6]}) \vee (P[10] \wedge T[6])$ $R[7] \leftarrow (P[7] \wedge \overline{T[7]}) \vee (P[10] \wedge T[7])$ $R[8] \leftarrow (P[8] \wedge \overline{T[8]}) \vee (P[10] \wedge T[8])$ $R[9] \leftarrow (P[1] \wedge \overline{T[1]}) \vee (P[10] \wedge T[1])$ $R[10] \leftarrow (P[5] \wedge \overline{T[5]}) \vee (P[10] \wedge T[5])$ (5) means for computing I[9–12] and SLAST according to the following:

$I[9] \leftarrow LAST \wedge R[1]$ $I[10] \leftarrow LAST \wedge (I[9] \oplus R[2])$ $I[11] \leftarrow LAST \wedge (I[10] \oplus R[3])$ $I[12] \leftarrow LAST \wedge (I[11] \oplus R[4])$ $SLAST \leftarrow I[12] \oplus R[5]$ (6) means for computing SP[1–5] according to the following:

$SP[1] \leftarrow R[1] \oplus R[6]$ $SP[2] \leftarrow R[2] \oplus R[7]$ $SP[3] \leftarrow R[3] \oplus R[8]$ $SP[4] \leftarrow R[4] \oplus R[9]$ $SP[5] \leftarrow R[5] \oplus R[10]$ (7) means for computing ST[1–4] according to the following:

$ST[1] \leftarrow I[10] \wedge I[11] \wedge I[12]$ $ST[2] \leftarrow \overline{I[10]} \wedge I[11] \wedge I[12]$ $ST[3] \leftarrow \overline{I[11]} \wedge I[12]$ $ST[4] \leftarrow \overline{I[12]}$ (8) means for computing SR[1–4] according to the following:

$SR[1] \leftarrow (SP[2] \wedge \overline{ST[2]}) \vee (SP[4] \wedge ST[2])$ $SR[2] \leftarrow (SP[3] \wedge \overline{ST[3]}) \vee (SP[4] \wedge ST[3])$ $SR[3] \leftarrow (SP[1] \wedge ST[1]) \vee (SP[2] \wedge ST[2]) \vee (SP[3] \wedge ST[3]) \vee (SP[4] \wedge ST[4])$ $SR[4] \leftarrow SP[5]$ (9) means for computing I[13–15] according to the following:

$I[13] \leftarrow LAST \wedge SLAST \wedge SR[3]$ $I[14] \leftarrow LAST \wedge SLAST \wedge (SR[2] \oplus SR[3])$ $I[15] \leftarrow LAST \wedge SLAST \wedge (SR[1] \oplus SR[2] \oplus SR[3] \oplus SR[4])$ (10) wherein the symbol "←" stores a result, the symbol "∨" is a Boolean OR operation, the symbol "∧" is a Boolean AND operation, the symbol "⊕" is a Boolean XOR operation, the overline "¯" indicates bit negation, the brackets "[ ]" indicate a bit position, and the parentheses indicate a precedence order.

33. An article of manufacture embodying logic for encoding a track identifier for servo control in a data storage device, the logic comprising:

(a) encoding the track identifier as a snake-in-the-box code; and (b) storing the encoded track identifier as servo information on the data storage device.

34. The article of manufacture of claim 33, wherein the encoded track identifier contains bits identifying a track position, as well as bits for error detection.

35. The article of manufacture of claim 34, wherein the snake-in-the-box code allows for detection of one or more errors in the encoded track identifier.

36. The article of manufacture of claim 33, wherein adjacent ones of the encoded track identifiers are at a Hamming distance of exactly 1 and non-adjacent ones of the encoded track identifiers are at a Hamming distance of at least 2.

37. The article of manufacture of claim 33, the logic further comprising mapping k bits of the track identifier into n bits of a track identifier field in a logically efficient way, such that a result is the snake-in-the-box code.

38. The article of manufacture of claim 37, wherein an input to the encoding logic is given by a k-bit vector (I[1], I[2], . . . , I[k]) that represents the track identifier and an output from the encoding logic is an n-bit vector (ENC[1], ENC[2], . . . , ENC[n]) that represents the track identifier field.

39. The article of manufacture of claim 38, wherein k=15 and n=b 19.

40. The article of manufacture of claim 39, wherein the encoding logic comprises the logic of:

(1) computing SLAST according to the following:
$SLAST \leftarrow \overline{I[13]} \vee I[14] \wedge I[15]$ (2) computing SENC[9,2,3,4,10] according to the following:

$SENC[9] \leftarrow I[9]$
$SENC[2] \leftarrow I[9] \wedge I[10]$
$SENC[3] \leftarrow I[10] \oplus I[11]$
$SENC[4] \leftarrow I[11] \oplus I[12]$
$SENC[10] \leftarrow I[12] \oplus SLAST$ (3) computing SR[1–5] according to the following:

$SR[1] \leftarrow 0$
$SR[2] \leftarrow (\overline{I[13]} \oplus I[14] \oplus I[15]) \vee I[14] \vee I[15]$
$SR[3] \leftarrow I[13] \oplus I[14]$
$SR[4] \leftarrow I[13]$
$SR[5] \leftarrow \overline{I[13]} \vee I[14] \wedge I[15]$ (4) computing ST[1–4] according to the following:
$ST[1] \leftarrow \overline{I[10]} \wedge I[11] \wedge I[12]$
$ST[2] \leftarrow \overline{I[10]} \wedge I[11] \wedge I[12]$
$ST[3] \leftarrow \overline{I[11]} \wedge I[12]$
$ST[4] \leftarrow \overline{I[12]}$ (5) computing SP[1–5] according to the following:
$SP[1] \leftarrow (ST[1] \wedge SR[4]) \vee (\overline{ST[1]} \wedge SR[1])$
$SP[2] \leftarrow (ST[2] \wedge SR[4]) \vee (\overline{ST[2]} \wedge SR[2])$
$SP[3] \leftarrow (ST[3] \wedge SR[4]) \vee (\overline{ST[3]} \wedge SR[3])$
$SP[4] \leftarrow (ST[1] \wedge SR[1]) \vee (ST[2] \wedge SR[2])$
$\vee (ST[3] \wedge SR[3]) \vee (ST[4] \wedge SR[4])$
$SP[5] \leftarrow SR[5]$ (6) computing SENC[6,7,8,2,5] according to the following:
$SENC[6] \leftarrow (SLAST \wedge (SP[1] \oplus SENC[9])) \vee (\overline{SLAST} \wedge SENC[9])$
$SENC[7] \leftarrow (SLAST \wedge (SP[2] \oplus SENC[2])) \vee (\overline{SLAST} \wedge SENC[2])$
$SENC[8] \leftarrow (SLAST \wedge (SP[3] \oplus SENC[3])) \vee (\overline{SLAST} \wedge SENC[3])(7)$
$SENC[1] \leftarrow (SLAST \wedge (SP[4] \oplus SENC[4])) \vee (\overline{SLAST} \wedge SENC[4])$
$SENC[5] \leftarrow (SLAST \wedge (SP[5] \oplus SENC[10])) \vee (\overline{SLAST} \wedge SENC[10])$ (7) computing LAST according to the following:
$LAST \leftarrow I[9] \vee I[10] \vee I[11] \vee I[12] \vee I[13] \vee I[14] \vee I[15]$ (8) computing ENC[1–9] according to the following:

$ENC[1] \leftarrow I[1]$
$ENC[2] \leftarrow I[1] \oplus I[2]$
$ENC[3] \leftarrow I[2] \oplus I[3]$
$ENC[4] \leftarrow I[3] \oplus I[4]$
$ENC[5] \leftarrow I[4] \oplus I[5]$
$ENC[6] \leftarrow I[5] \oplus I[6]$
$ENC[7] \leftarrow I[6] \oplus I[7]$
$ENC[8] \leftarrow I[7] \oplus I[8]$
$ENC[9] \leftarrow I[8] \oplus LAST$ (9) computing T[1–8] according to the following:
$T[1] \leftarrow I[2] \wedge I[3] \wedge I[4] \wedge I[5] \wedge I[6] \wedge I[7] \wedge I[8]$
$T[2] \leftarrow \overline{I[2]} \wedge I[3] \wedge I[4] \wedge I[5] \wedge I[6] \wedge I[7] \wedge I[8]$
$T[3] \leftarrow \overline{I[3]} \wedge I[4] \wedge I[5] \wedge I[6] \wedge I[7] \wedge I[8]$
$T[4] \leftarrow \overline{I[4]} \wedge I[5] \wedge I[6] \wedge I[7] \wedge I[8]$
$T[5] \leftarrow \overline{I[5]} \wedge I[6] \wedge I[7] \wedge I[8]$
$T[6] \leftarrow \overline{I[6]} \wedge I[7] \wedge I[8]$
$T[7] \leftarrow \overline{I[7]} \wedge I[8]$
$T[8] \leftarrow \overline{I[8]}$ (10) computing P[1–10] according to the following:
$P[1] \leftarrow (T[1] \wedge SENC[9]) \vee (\overline{T[1]} \wedge SENC[1])$
$P[2] \leftarrow (T[2] \wedge SENC[9]) \vee (\overline{T[2]} \wedge SENC[2])$
$P[3] \leftarrow (T[3] \wedge SENC[9]) \vee (\overline{T[3]} \wedge SENC[3])$
$P[4] \leftarrow (T[4] \wedge SENC[9]) \vee (\overline{T[4]} \wedge SENC[4])$
$P[5] \leftarrow (T[5] \wedge SENC[9]) \vee (\overline{T[5]} \wedge SENC[5])$
$P[6] \leftarrow (T[6] \wedge SENC[9]) \vee (\overline{T[6]} \wedge SENC[6])$
$P[7] \leftarrow (T[7] \wedge SENC[9]) \vee (\overline{T[7]} \wedge SENC[7])$
$P[8] \leftarrow (T[8] \wedge SENC[9]) \vee (\overline{T[8]} \wedge SENC[8])$ $P[9] \leftarrow SENC[10]$
$P[10] \leftarrow (T[1] \wedge SENC[1]) \wedge (T[2] \wedge SENC[2])$
$\vee (T[3] \wedge SENC[3]) \vee (T[4] \wedge SENC[4])$
$\vee (T[5] \wedge SENC[5]) \vee (T[6] \wedge SENC[6])$
$\vee (T[7] \wedge SENC[7]) \vee (T[8] \wedge SENC[8])$ (11) computing ENC[10–19] according to the following:
$ENC[10] \leftarrow (LAST \wedge (P[1] \oplus ENC[1])) \vee (\overline{LAST} \wedge ENC[1])$
$ENC[11] \leftarrow (LAST \wedge (P[2] \oplus ENC[2])) \vee (\overline{LAST} \wedge ENC[2])$
$ENC[12] \leftarrow (LAST \wedge (P[3] \oplus ENC[3])) \vee (\overline{LAST} \wedge ENC[3])$
$ENC[13] \leftarrow (LAST \wedge (P[4] \oplus ENC[4])) \vee (\overline{LAST} \wedge ENC[4])$
$ENC[14] \leftarrow (LAST \wedge (P[5] \oplus ENC[5])) \vee (\overline{LAST} \wedge ENC[5])$
$ENC[15] \leftarrow (LAST \wedge (P[6] \oplus ENC[6])) \vee (\overline{LAST} \wedge ENC[6])$
$ENC[16] \leftarrow (LAST \wedge (P[7] \oplus ENC[7])) \vee (\overline{LAST} \wedge ENC[7])$
$ENC[17] \leftarrow (LAST \wedge (P[8] \oplus ENC[8])) \vee (\overline{LAST} \wedge ENC[8])$
$ENC[18] \leftarrow (LAST \wedge (P[9] \oplus ENC[9])) \vee (\overline{LAST} \wedge ENC[9])$
$ENC[19] \leftarrow LAST \wedge P[10]$ (12) wherein the symbol "←" stores a result, the symbol "∨" is a Boolean OR operation, the symbol "∧" is a Boolean AND operation, the symbol "⊕" is a Boolean XOR operation, the overline "‾" indicates bit negation, the brackets "[ ]" indicate a bit position, and the parentheses indicate a precedence order.

41. An article of manufacture embodying logic for decoding a track identifier for servo control in a data storage device, the logic comprising:
   (a) accessing an encoded track identifier stored as servo information on the data storage device; and
   (b) decoding the track identifier as a snake-in-the-box code.

42. The article of manufacture of claim 41, wherein the encoded track identifier contains bits identifying a track position, as well as bits for error detection.

43. The article of manufacture of claim 41, wherein the snake-in-the-box code allows for detection of one or more errors in the encoded track identifier.

44. The article of manufacture of claim 41, wherein adjacent ones of the encoded track identifiers are at a Hamming distance of exactly 1 and non-adjacent ones of the encoded track identifiers are at a Hamming distance of at least 2.

45. The article of manufacture of claim 41, wherein the decoding logic further comprises mapping n bits of a track identifier field into k bits of the encoded track identifier in a logically efficient way, such that a result is the track identifier.

46. The article of manufacture of claim 45, wherein an input to the decoding logic is given by a n-bit vector (B[1], B[2], . . . , B[n]) that represents the track identifier field and an output from the decoding logic is given by a k-bit vector (I[1], I[2], . . . , I[k]) that represents the track identifier.

47. The article of manufacture of claim 46, wherein n=19 and k=15.

48. The article of manufacture of claim 47, wherein the decoding logic comprises the logic of:

(1) computing I[1–8] and LASTF according to the following:

$I[1] \leftarrow B[1]$ $I[2] \leftarrow I[1] \oplus B[2]$ $I[3] \leftarrow I[2] \oplus B[3]$ $I[4] \leftarrow I[3] \oplus B[4]$ $I[5] \leftarrow I[4] \oplus B[5]$ $I[6] \leftarrow I[5] \oplus B[6]$ $I[7] \leftarrow I[6] \oplus B[7]$ $I[8] \leftarrow I[7] \oplus B[8]$ $LASTF \leftarrow I[8] \oplus B[9]$ (2) computing P[1–9] according to the following:

$P[1] \leftarrow B[1] \oplus B[10]$ $P[2] \leftarrow B[2] \oplus B[11]$ $P[3] \leftarrow B[3] \oplus B[12]$ $P[4] \leftarrow B[4] \oplus B[13]$ $P[5] \leftarrow B[5] \oplus B[14]$ $P[6] \leftarrow B[6] \oplus B[15]$ $P[7] \leftarrow B[7] \oplus B[16]$ $P[8] \leftarrow B[8] \oplus B[17]$ $P[9] \leftarrow B[9] \oplus B[18]$ (3) computing T[1–8] according to the following:

$T[1] \leftarrow \overline{I[2]} \wedge I[3] \wedge I[4] \wedge I[5] \wedge I[6] \wedge I[7] \wedge I[8]$ $T[2] \leftarrow \overline{I[2]} \wedge I[3] \wedge I[4] \wedge I[5] \wedge I[6] \wedge I[7] \wedge I[8]$ $T[3] \leftarrow \overline{I[3]} \wedge I[4] \wedge I[5] \wedge I[6] \wedge I[7] \wedge I[8]$ $T[4] \leftarrow \overline{I[4]} \wedge I[5] \wedge I[6] \wedge I[7] \wedge I[8]$ $T[5] \leftarrow \overline{I[5]} \wedge I[6] \wedge I[7] \wedge I[8]$ $T[6] \leftarrow \overline{I[6]} \wedge I[7] \wedge I[8]$ $T[7] \leftarrow \overline{I[7]} \wedge I[8]$ $T[8] \leftarrow \overline{I[8]}$ (4) computing R[1–10] according to the following:

$R[1] \leftarrow (P[1] \wedge T[1]) \vee (P[2] \wedge T[2]) \vee (P[3] \wedge T[3]) \vee (P[4] \wedge T[4])$
   $\vee (P[5] \wedge T[5]) \vee (P[6] \wedge T[6]) \vee (P[7] \wedge T[7]) \vee (P[8] \wedge T[8])$ $R[2] \leftarrow (P[2] \wedge \overline{T[2]}) \vee (P[10] \wedge T[2])$ $R[3] \leftarrow (P[3] \wedge \overline{T[3]}) \vee (P[10] \wedge T[3])$ $R[4] \leftarrow (P[4] \wedge \overline{T[4]}) \vee (P[10] \wedge T[4])$ $R[5] \leftarrow P[9] (5$ $R[6] \leftarrow (P[6] \wedge \overline{T[6]}) \vee (P[10] \wedge T[6])$ $R[7] \leftarrow (P[7] \wedge \overline{T[7]}) \vee (P[10] \wedge T[7])$ $R[8] \leftarrow (P[8] \wedge \overline{T[8]}) \vee (P[10] \wedge T[8])$ $R[9] \leftarrow (P[1] \wedge T[1]) \vee (P[10] \wedge T[1])$ $R[10] \leftarrow (P[5] \wedge \overline{T[5]}) \vee (P[10] \wedge T[5])$ (5) computing I[9–12] and SLAST according to the following:

$I[9] \leftarrow LAST \wedge R[1]$ $I[10] \leftarrow LAST \wedge (I[9] \oplus R[2])$ $I[11] \leftarrow LAST \wedge (I[10] \oplus R[3])$ $I[12] \leftarrow LAST \wedge (I[11] \oplus R[4])$ $SLAST \leftarrow I[12] \oplus R[5]$ (6) computing SP[1–5] according to the following:

$SP[1] \leftarrow R[1] \oplus R[6]$ $SP[2] \leftarrow R[2] \oplus R[7]$ $SP[3] \leftarrow R[3] \oplus R[8]$ $SP[4] \leftarrow R[4] \oplus R[9]$ $SP[5] \leftarrow R[5] \oplus R[10]$ (7) computing ST[1–4] according to the following:

$ST[1] \leftarrow I[10] \wedge I[11] \wedge I[12]$ $ST[2] \leftarrow \overline{I[10]} \wedge I[11] \wedge I[12]$ $ST[3] \leftarrow \overline{I[11]} \wedge I[12]$ $ST[4] \leftarrow \overline{I[12]}$ (8) computing SR[1–4] according to the following:

$SR[1] \leftarrow (SP[2] \wedge \overline{ST[2]}) \vee (SP[4] \wedge ST[2])$ $SR[2] \leftarrow (SP[3] \wedge \overline{ST[3]}) \vee (SP[4] \wedge ST[3])$ $SR[3] \leftarrow (SP[1] \wedge \overline{ST[1]}) \vee (SP[2] \wedge ST[2])$
   $\vee (SP[3] \wedge ST[3]) \vee (SP[4] \wedge ST[4])$ $SR[4] \leftarrow SP[5]$ (9) computing I[13–15] according to the following:

$I[13] \leftarrow \overline{LAST} \wedge SLAST \wedge SR[3]$
$I[14] \leftarrow \overline{LAST} \wedge SLAST \wedge (SR[2] \oplus SR[3])$
$I[15] \leftarrow \overline{LAST} \wedge SLAST \wedge (SR[1] \oplus SR[2] \oplus SR[3] \oplus SR[4])$ (10) wherein the symbol "←" stores a result, the symbol "∨" is a Boolean OR operation, the symbol "∧" is a Boolean AND operation, the symbol "⊕" is a Boolean XOR operation, the overline "" indicates bit negation, the brackets "[ ]" indicate a bit position, and the parentheses indicate a precedence order.

* * * * *